US011824288B2

United States Patent
Hsieh et al.

(10) Patent No.: US 11,824,288 B2
(45) Date of Patent: Nov. 21, 2023

(54) CABLE CONNECTION DEVICE

(71) Applicant: Delta Electronics, Inc., Taoyuan (TW)

(72) Inventors: Hung-Sheng Hsieh, Taoyuan (TW); Yu-Wei Kuo, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 135 days.

(21) Appl. No.: 17/500,249

(22) Filed: Oct. 13, 2021

(65) Prior Publication Data
US 2022/0416454 A1 Dec. 29, 2022

(30) Foreign Application Priority Data
Jun. 25, 2021 (CN) .......................... 202110709265.9

(51) Int. Cl.
H01R 12/53 (2011.01)
H01R 13/514 (2006.01)
H01R 4/2416 (2018.01)
B60L 53/16 (2019.01)

(52) U.S. Cl.
CPC .......... *H01R 12/53* (2013.01); *H01R 13/514* (2013.01); *B60L 53/16* (2019.02); *H01R 4/2416* (2013.01); *H01R 2201/26* (2013.01)

(58) Field of Classification Search
CPC ................ H01R 4/2416; H01R 13/514; H01R 2201/26; H01R 12/53; B60L 53/16
See application file for complete search history.

(56) References Cited

U.S. PATENT DOCUMENTS

| 5,106,323 | A | 4/1992 | Gerhard |
| 7,857,635 | B2* | 12/2010 | Goodrich ........... H01R 13/6463 |
| | | | 439/418 |
| 2009/0142968 | A1 | 6/2009 | Goodrich et al. |
| 2009/0305576 | A1 | 12/2009 | Mossner et al. |

(Continued)

FOREIGN PATENT DOCUMENTS

| JP | 2008071646 A | 3/2008 |
| TW | 452999 B | 9/2001 |
| TW | M298824 U | 10/2006 |

(Continued)

*Primary Examiner* — Briggitte R. Hammond
(74) *Attorney, Agent, or Firm* — KIRTON McCONKIE; Evan R. Witt

(57) ABSTRACT

A cable connection device is provided. The cable connection device includes a casing, a connection component, a power cable and a circuit board. The casing includes a first accommodation space, a second accommodation space and a channel. The channel is in communication between the first accommodation space and the second accommodation space. The connection component is penetrated through the channel and includes a clamping part disposed in the first accommodation space and a first conductive part disposed in the second accommodation space. Portion of the power cable is disposed in the first accommodation space. The clamping part clamps the power cable and partially pierces the insulating sleeve, so that the clamping part is connected with the wire core. The circuit board is disposed in the second accommodation space and comprises second conductive part. The second conductive part is contacted with the first conductive part.

20 Claims, 10 Drawing Sheets

(56) References Cited

U.S. PATENT DOCUMENTS

2014/0273605 A1    9/2014   Chang et al.

FOREIGN PATENT DOCUMENTS

| TW | M403145 U   | 5/2011  |
| TW | M518420 U   | 3/2016  |
| TW | M550491 U   | 10/2017 |
| TW | 202019027 A | 5/2020  |

* cited by examiner

CABLE CONNECTION DEVICE

CROSS-REFERENCE TO RELATED APPLICATION

This application claims priority to China Patent Application No. 202110709265.9, filed on Jun. 25, 2021, the entire contents of which are incorporated herein by reference for all purposes.

FIELD OF THE INVENTION

The present disclosure relates to a cable connection device, and more particularly to a cable connection device with high stability.

BACKGROUND OF THE INVENTION

With increasing development of electric system and environmental consciousness, it is a trend to replace the fossil energy with clean electric energy. Demand for private electric vehicle and electric engineering tools is increased gradually. Accordingly, the charging device used to charge the private electric vehicle and the electric engineering tools is gradually popular. The safety of the charging device is an issue that must be paid attention to. The charging end of the charging device provides the power with high current and high voltage, and the power receiving end of the charging device receives the power with high current and high voltage. Consequently, it is very important to maintain the connection stability between the control element and the signal source of the charging device, and maintain the connection stability between the control element and the ground wire. The control element and the signal source of the conventional charging device are connected with each other by utilizing soldering process. The control element and the ground wire of the conventional charging device are connected with each other by utilizing riveting process. However, the aforementioned method is more complicated and the stability of the connection is not satisfied.

Therefore, there is a need of providing a cable connection device in order to overcome the above drawbacks.

SUMMARY OF THE INVENTION

The present disclosure provides a cable connection device in order to increase the stability of connection.

In accordance with an aspect of the present disclosure, a cable connection device is provided. The cable connection device includes a casing, at least one connection component, at least one power cable and a circuit board. The casing includes a first accommodation space, a second accommodation space and at least one channel. The channel is in communication between the first accommodation space and the second accommodation space. The at least one connection component is penetrated through the at least one channel and each connection component includes a clamping part and a first conductive part. The clamping part and the first conductive part are opposite to each other. The clamping part is disposed in the first accommodation space. The first conductive part is disposed in the second accommodation space. At least portion of the at least one power cable is disposed in the first accommodation space. Each power cable includes an insulating sleeve and a wire core. An outer periphery of the wire core is covered by the insulating sleeve. The clamping part clamps the at least one power cable and partially pierces the insulating sleeve, so that the clamping part is electrically connected with the wire core. The circuit board is disposed in the second accommodation space and includes at least one second conductive part. The at least one second conductive part is contacted with the first conductive part.

In accordance with another aspect of the present disclosure, a cable connection device is provided. The cable connection device includes a casing, a first connection component, a second connection component, a first power cable, a second power cable and a circuit board. The casing includes a first accommodation space, a second accommodation space, a third accommodation space, a first channel and a second channel. The first channel is in communication between the first accommodation space and the second accommodation space. The second channel is in communication between the second accommodation space and the third accommodation space. The first connection component is penetrated through the first channel and includes a clamping part and a first conductive part. The clamping part and the first conductive part of the first connection component are opposite to each other. The clamping part of the first connection component is disposed in the first accommodation space. The first conductive part of the first connection component is disposed in the second accommodation space. The second connection component is penetrated through the second channel and includes a clamping part and a first conductive part. The clamping part and the first conductive part of the second connection component are opposite to each other. The clamping part of the second connection component is disposed in the third accommodation space. The first conductive part of the second connection component is disposed in the second accommodation space. At least portion of the first power cable is disposed in the first accommodation space. The first power cable includes an insulating sleeve and a wire core. An outer periphery of the wire core of the first power cable is covered by the insulating sleeve. The clamping part of the first connection component clamps the first power cable and partially pierces the insulating sleeve, so that the clamping part of the first connection component is electrically connected with the wire core of the first power cable. At least portion of the second power cable is disposed in the third accommodation space. The second power cable includes an insulating sleeve and a wire core. An outer periphery of the wire core of the second power cable is covered by the insulating sleeve. The clamping part of the second connection component clamps the second power cable and partially pierces the insulating sleeve, so that the clamping part of the second connection component is electrically connected with the wire core of the second power cable. The circuit board is disposed in the second accommodation space and includes a plurality of second conductive parts. The plurality of second conductive parts are contacted with the first conductive part of the first connection component and the second conductive part of the second connection component, respectively.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
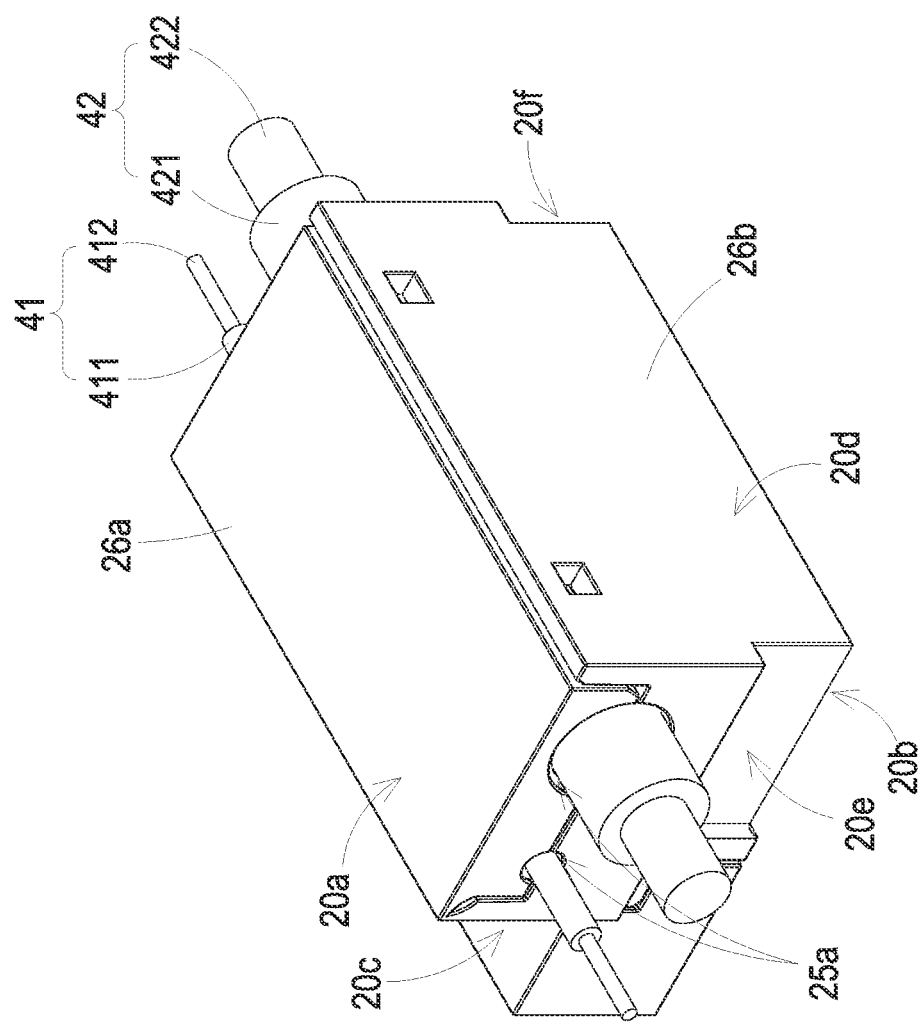
FIG. 1 is a schematic perspective view illustrating a cable connection device according to a first embodiment of the present disclosure.
Figure 2:
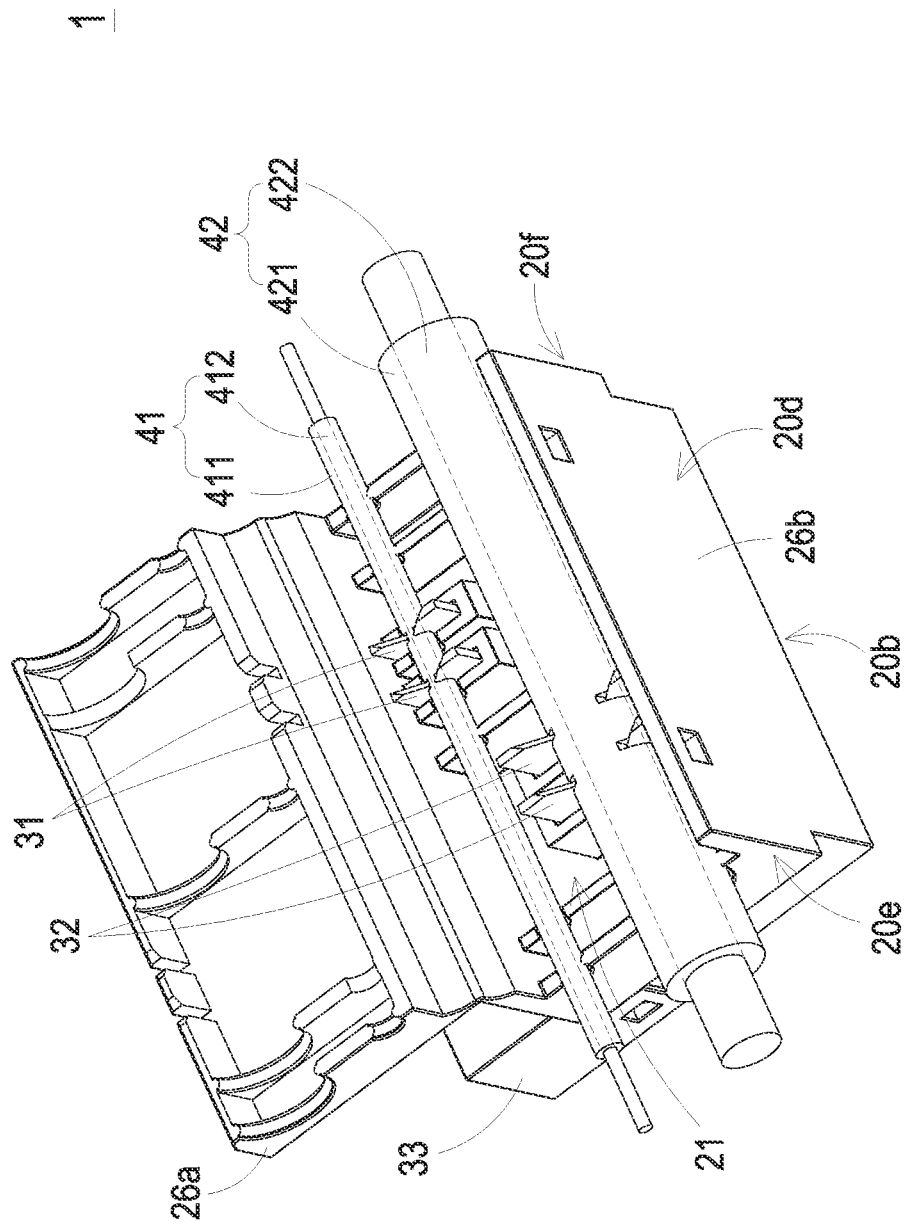
FIG. 2 is a schematic perspective view illustrating the cable connection device of FIG. 1, wherein an upper casing part and a lower casing part of the cable connection device are partially separated from each other.
Figure 3:
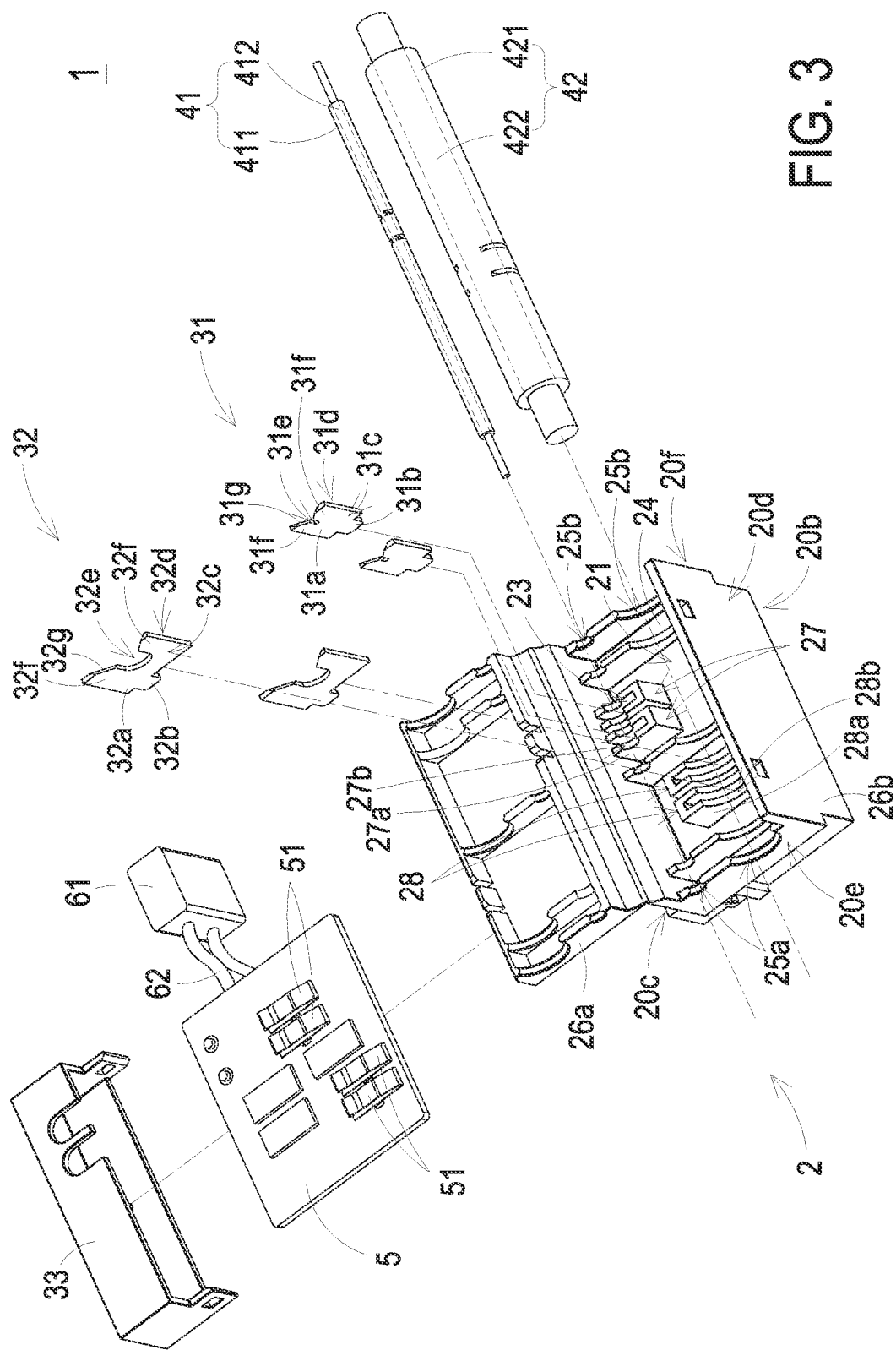
FIG. 3 is a schematic exploded view illustrating the cable connection device of FIG. 2.
Figure 4:
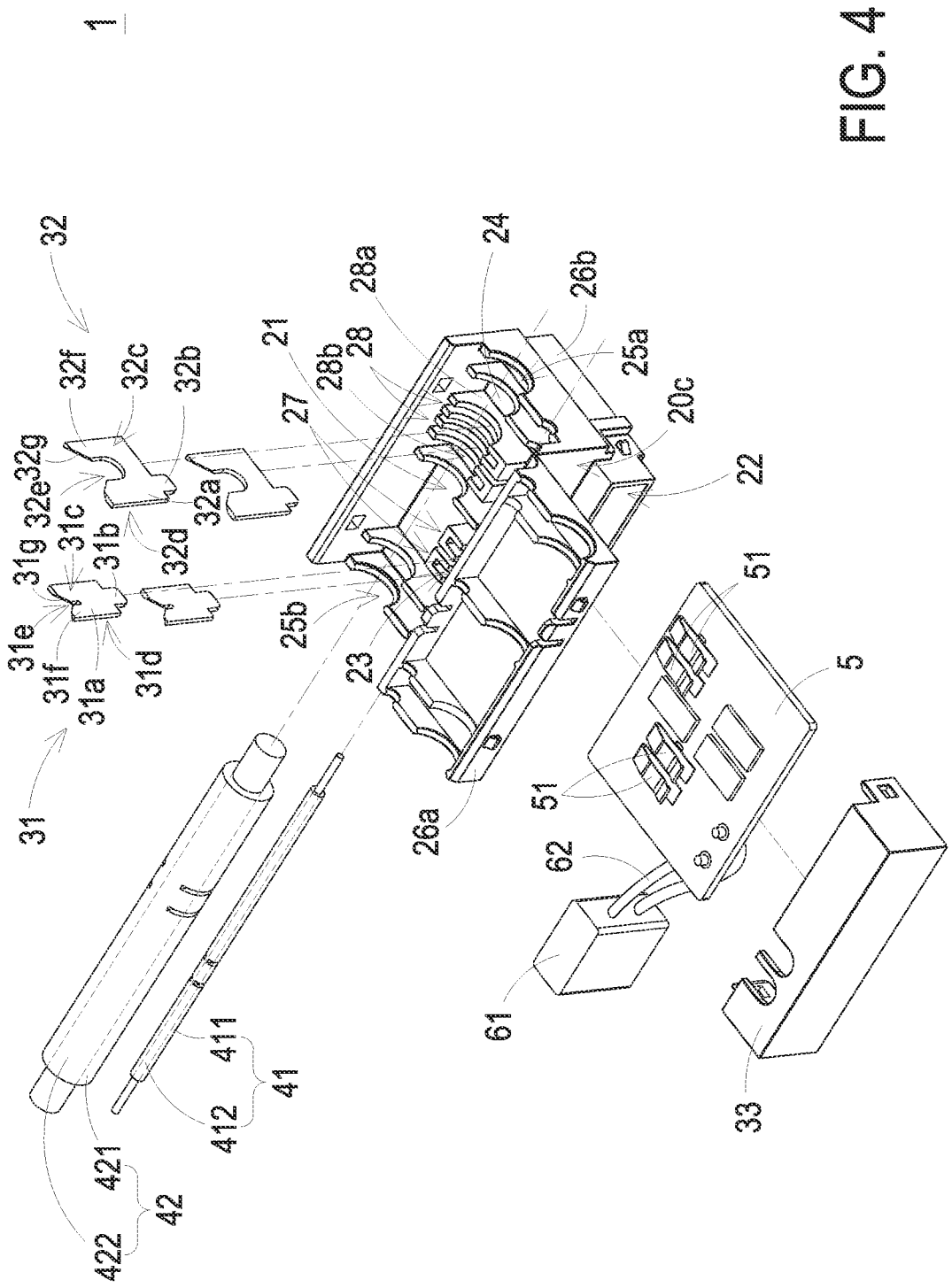
FIG. 4 is a schematic exploded view illustrating the cable connection device of FIG. 2 and taken along another viewpoint.

FIG. 1 is a schematic perspective view illustrating a cable connection device according to a first embodiment of the present disclosure. FIG. 2 is a schematic perspective view illustrating the cable connection device of FIG. 1, wherein an upper casing part and a lower casing part of the cable connection device are partially separated from each other. FIG. 3 is a schematic exploded view illustrating the cable connection device of FIG. 2. FIG. 4 is a schematic exploded view illustrating the cable connection device of FIG. 2 and taken along another viewpoint. As shown in FIGS. 1 to 4, in the embodiment, the cable connection device 1 is applied to a charging device (not shown) for charging a load (not shown). For example, the cable connection device 1 is applied to a charging device of an electric vehicle for charging the electric vehicle. The cable connection device 1 includes a casing 2, at least one first connection component 31, at least one second connection component 32, a first power cable 41, a second power cable 42, a circuit board 5, a control element 61 and a connection cable 62.

The casing 2 includes a first accommodation space 21, a second accommodation space 22 and at least one channel 23, as shown in FIG. 4. The first accommodation space 21 and the second accommodation space 22 are separated from each other by a partition plate 24 and disposed beside two sides of the partition plate 24, respectively. The channel 23 runs through the partition plate 24 and in communication between the first accommodation space 21 and the second accommodation space 22. The number of the channel 23 is corresponding to the sum of the number of the first connection component 31 and the number of the second connection component 32. In this embodiment, the number of the first connection component 31 is two. The number of the second connection component 32 is two. The number of the channel 23 is four. Each first connection component 31 is made of conductive material and penetrated through the corresponding channel 23. Each first connection component 31 includes a clamping part 31a and a first conductive part 31b opposite to each other. The clamping part 31a is constituted by one end of the first connection component 31 far away from the partition plate 24. The clamping part 31a is disposed within the first accommodation space 21. The first conductive part 31b is disposed within the second accommodation space 22. The first power cable 41 receives a control signal of the charging device and transmits the control signal to the load. At least portion of the first power cable 41 is disposed within the first accommodation space 21. The other portion of the first power cable 41 is exposed to the exterior of the casing 2. The first power cable 41 includes an insulating sleeve 411 and a wire core 412. The insulating sleeve 411 of the first power cable 41 covers the outer periphery of the wire core 412, as shown in FIG. 3. The wire core 412 is made of conductive material and transmits the control signal of the charging device to the load. The clamping part 31a of the first connection component 31 clamps the first power cable 41 disposed within the first accommodation space 21 and partially pierces the insulating sleeve 411 of the first power cable 41, so that the clamping part 31a of the first connection component 31 is electrically connected with the wire core 412 of the first power cable 41.

Each second connection component 32 is made of conductive material and penetrated through the corresponding channel 23. Each second connection component 32 includes a clamping part 32a and a first conductive part 32b opposite to each other. The clamping part 32a is constituted by one end of the second connection component 32 far away from the partition plate 24. The clamping part 32a is disposed within the first accommodation space 21. The first conductive part 32b is disposed within the second accommodation space 22. The second power cable 42 is electrically connected with ground. At least portion of the second power cable 42 is disposed within the first accommodation space 21. The other portion of the second power cable 42 is exposed to the exterior of the casing 2. The second power cable 42 includes an insulating sleeve 421 and a wire core 422. The insulating sleeve 421 of the second power cable 42 covers the outer periphery of the wire core 422. The wire core 422 is made of conductive material and electrically connected with ground. The clamping part 32a of the second connection component 32 clamps the second power cable 42 disposed within the first accommodation space 21 and partially pierces the insulating sleeve 421 of the second power cable 42, so that the clamping part 32a of the second connection component 32 is electrically connected with the wire core 422 of the second power cable 42.

The circuit board 5 is disposed within the second accommodation space 22, as shown in FIG. 4. The circuit board 5 includes at least one second conductive part 51. The second conductive part 51 is a resilient contact piece made of conductive material and disposed on one side of the circuit board 5 adjacent to the partition plate 24. The number of the second conductive part 51 is corresponding to the sum of the number of the first connection component 31 and the number of the second connection component 32. For example, the number of the second conductive part 51 is four, as shown in FIG. 4. The positions of the four second conductive parts 51 are corresponding to the positions of the two first conductive parts 31b of the first connection component 31 and the positions of the two first conductive parts 32b of the second connection component 32, respectively. The four second conductive parts 51 are engaged with the corresponding engagement parts (not shown) of the casing 2, respectively, so that the circuit board 5 is fixed within the second accommodation space 22 of the casing 2. Each engagement part is in communication with the corresponding channel 23. Two of the four second conductive parts 51 are contacted and engaged with the corresponding first conductive parts 31b of the first connection component 31 through the corresponding engagement parts, respectively. The other two of the four second conductive parts 51 are contacted and engaged with the corresponding first conductive part 32b of the second connection component 32 through the corresponding engagement part, respectively.

The control element 61 transmits the control signal of the charging device to the load and controls the load. The connection cable 62 is connected between the control element 61 and the circuit board 5. The connection cable 62 is electrically connected with the second conductive part 51 through the conductive wire within the circuit board 5. The control signal transmitted by the control element 61 is transmitted to the corresponding first conductive part 31b of the first connection component 31 through the second conductive part 51. The control signal transmitted by the control element 61 is transmitted to the wire core 412 of the first power cable 41 through the clamping part 31a of the first connection component 31, so that the load is controlled by the control signal. Moreover, the control element 61 transmits the current needed to be grounded to the corresponding first conductive part 32b of the second connection component 32 through the second conductive part 51. The current is transmitted to the wire core 422 of the second power cable 42 through the clamping part 32a of the second connection component 32, so that the current is grounded.

As mentioned above, the cable connection device 1 of the present disclosure includes the first connection component 31 and the second connection component 32. The clamping part 31a, 31b of each connection component 31, 32 is contacted with the corresponding wire core 412, 422 of the power cable 41, 42. The first conductive part 31b, 32b of each connection component 31, 32 is contacted with the second conductive part 51 of the circuit board 5, so that the first conductive part 31b, 32b of each connection component 31, 32 is electrically connected with the control element 61. The control element and the signal source of the conventional charging device are connected with each other by utilizing soldering process, and the control element and the ground wire of the conventional charging device are connected with each other by utilizing riveting process. In comparison with the conventional charging device, the connection component 31, 32 of the cable connection device 1 of the present disclosure is connected with the wire core 412, 422 by piercing the power cable 41, 42, and the connection component 31, 32 of the cable connection device 1 of the present disclosure is contacted with the circuit board 5. Consequently, the cable connection device 1 of the present disclosure does not use soldering process or riveting process additionally. When the power cable 41, 42 or the circuit board 5 need to be replaced, the power cable 41, 42 and the circuit boar 5 can be replaced by simply disassembling. The assembling process of the cable connection device 1 of the present disclosure is simple. The stability and the production yield of the cable connection device 1 are increased. The manufacturing cost of the cable connection device 1 is reduced. Moreover, the connection between the first power cable 41 and the first connection component 31 (i.e., the clamping part 31a of the first connection component 31) and the connection between the second power cable 42 and the second connection component 32 (i.e., the clamping part 32a of the second connection component 32) are disposed within the first accommodation space 21 of the casing 2. Consequently, the connections may not be impacted by external force, so that the connections are stable and not easy to separate.

Please refer to FIGS. 1 to 4 again. The casing 2 includes a first lateral surface 20a, a second lateral surface 20b, a third lateral surface 20c, a fourth lateral surface 20d, a fifth lateral surface 20e and a sixth lateral surface 20f. The first lateral surface 20a and the second lateral surface 20b are opposite to each other. The third lateral surface 20c and the fourth lateral surface 20d are opposite to each other and disposed between the first lateral surface 20a and the second lateral surface 20b. The fifth lateral surface 20e and the sixth lateral surface 20f are opposite to each other, disposed between the first lateral surface 20a and the second lateral surface 20b, and disposed between the third lateral surface 20c and the fourth lateral surface 20d.

As shown in FIG. 4, the clamping part 31a of the first connection component 31 includes a first surface 31c, a second surface 31d, a first groove 31e and two insertion parts 31f. The first surface 31c and the second surface 31d of the clamping part 31a of the first connection component 31 are opposite to each other. The first groove 31e is concavely formed by one side of the clamping part 31a adjacent to the first lateral surface 20a of the casing 2 for accommodating the first power cable 41. The clamping part 31a clamps the first power cable 41, so that the first power cable 41 is fixed within the first groove 31e. The two insertion parts 31f are disposed beside two sides of the first groove 31e and connected with the first groove 31e, respectively. When the first power cable 41 is accommodated in the first groove 31e, the two insertion parts 31f are inserted into the insulating sleeve 411 of the first power cable 41, so that the two insertion parts 31f are contacted with the wire core 412 of the first power cable 41. For allowing the clamping part 31a to pierce the insulating sleeve 411 of the first power cable 41 easily, each insertion part 31f includes an inclined surface 31g. The inclined surface 31g is adjacent to the first lateral surface 20a of the casing 2 and disposed between the first surface 31c and the second surface 31d. The inclined surface 31g is inclined from the first surface 31c toward the second surface 31d. Each insertion part 31f pierces the insulating sleeve 411 of the first power cable 41 through the corresponding inclined surface 31g.

Figure 5:
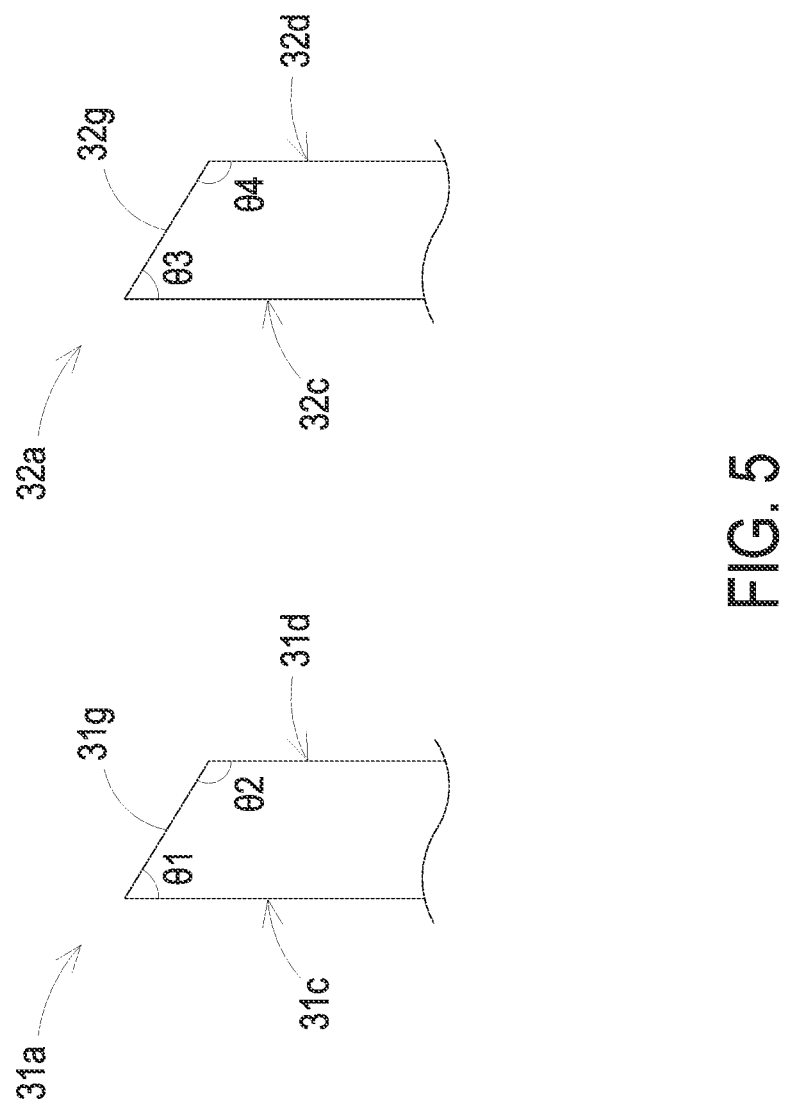
FIG. 5 is a schematic perspective view illustrating a portion of the connection component of the cable connection device of FIG. 2.

FIG. 5 is a schematic perspective view illustrating a portion of the connection component of the cable connection device of FIG. 2. As shown in FIGS. 4 and 5, a first angle θ1 is formed between the first surface 31c of the clamping part 31a of the first connection component 31 and the inclined surface 31g. A second angle θ2 is formed between the second surface 31d of the clamping part 31a of the first connection component 31 and the inclined surface 31g. The first angle θ1 is less than the second angle θ2. Preferably but not exclusively, the first angle θ1 is 45 degrees, and the second angle θ2 is 135 degrees.

As shown in FIG. 4, the clamping part 32a of the second connection component 32 includes a first surface 32c, a second surface 32d, a first groove 32e and two insertion parts 32f. The first surface 32c and the second surface 32d of the clamping part 32a of the second connection component 32 are opposite to each other. The first groove 32e is concavely formed by one side of the clamping part 32a adjacent to the first lateral surface 20a of the casing 2 for accommodating the second power cable 42. The clamping part 32a clamps the second power cable 42, so that the second power cable 42 is fixed within the first groove 32e. The two insertion parts 32f are disposed beside two sides of the first groove 32e and connected with the first groove 32e, respectively. When the second power cable 42 is accommodated in the first groove 32e, the two insertion parts 32f are inserted into the insulating sleeve 421 of the second power cable 42, so that the two insertion parts 32f are contacted with the wire core 422 of the second power cable 42. For allowing the clamping part 32a to pierce the insulating sleeve 421 of the second power cable 42 easily, each insertion part 32f includes an inclined surface 32g. The inclined surface 32g is adjacent to the first lateral surface 20a of the casing 2 and disposed between the first surface 32c and the second surface 32d. The inclined surface 32g is inclined from the first surface 32c toward the second surface 32d. Each insertion part 32f pierces the insulating sleeve 421 of the second power cable 42 through the corresponding inclined surface 32g.

As shown in FIG. 5, a first angle θ3 is formed between the first surface 32c of the clamping part 32a of the second connection component 32 and the inclined surface 32g. A second angle θ4 is formed between the second surface 32d of the clamping part 32a of the second connection component 32 and the inclined surface 32g. The first angle θ3 is less than the second angle θ4. Preferably but not exclusively, the first angle θ3 is 45 degrees, and the second angle θ4 is 135 degrees.

Figure 6:
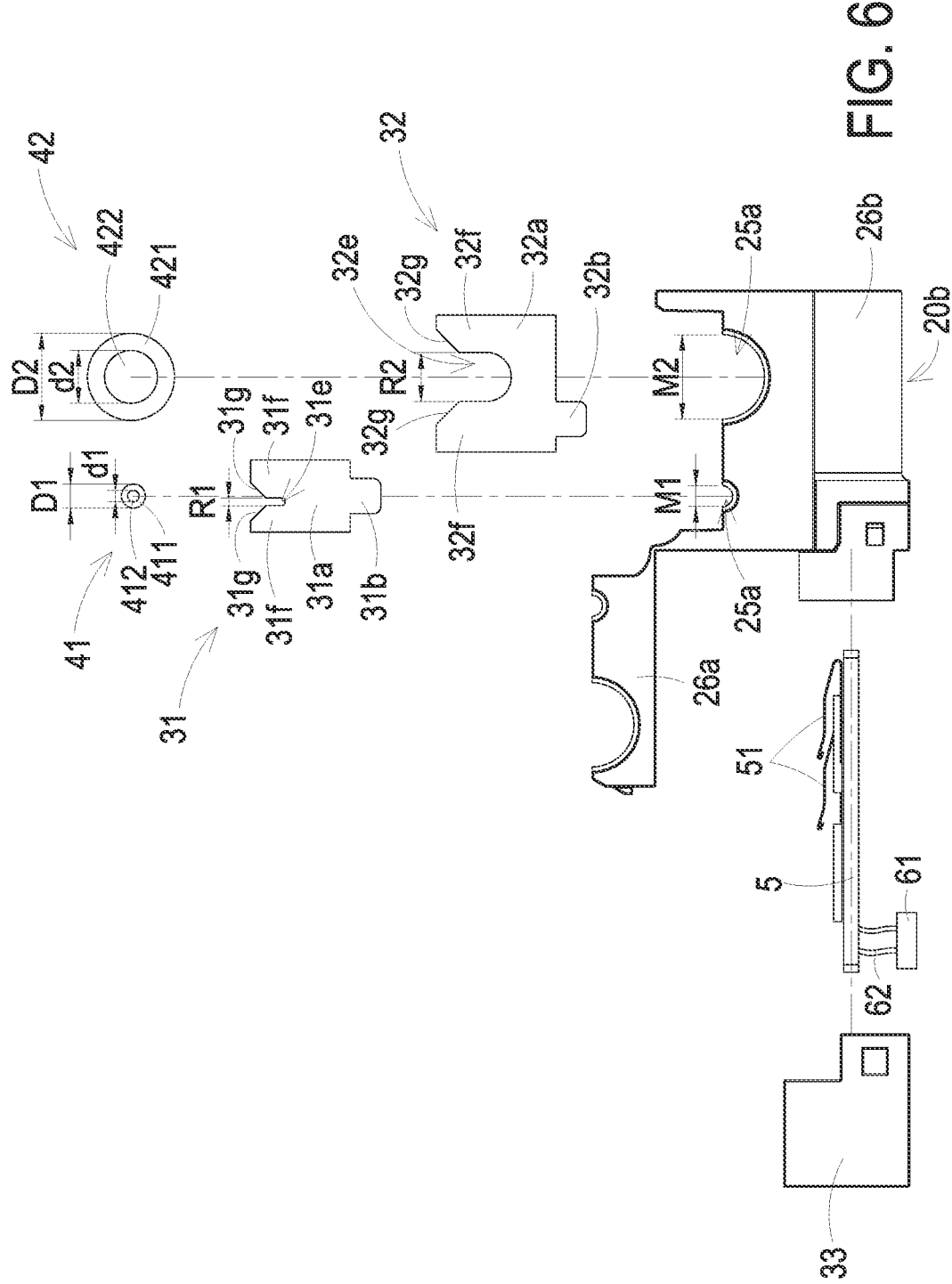
FIG. 6 is an exploded schematic front view illustrating the cable connection device of FIG. 2.

FIG. 6 is an exploded schematic front view illustrating the cable connection device of FIG. 2. As shown in FIGS. 1 to 4 and 6, the first groove 31e of the clamping part 31a of the first connection component 31 has a first groove width R1. The first groove width R1 is defined as the distance between a first connection edge and a second connection edge. The first connection edge is the connection between the inclined surface 31g of one of the two insertion parts 31f of the clamping part 31a of the first connection component 31 located at the left side of FIG. 5 and the first groove 31e. The second connection edge is the connection between the inclined surface 31g of the other one of the two insertion parts 31f of the clamping part 31a of the first connection component 31 located at the right side of FIG. 5 and the first groove 31e. The first groove width R1 of the first connection component 31 is less than or equal to the wire diameter d1 of the wire core 412 of the first power cable 41, so that the two insertion parts 31f are inserted into the insulating sleeve 411 of the first power cable 41 and contacted with the wire core 412 of the first power cable 41 when the first power cable 41 is accommodated in the first groove 31e.

The first groove 32e of the clamping part 32a of the second connection component 32 has a first groove width R2. The first groove width R2 is defined as the distance between a third connection edge and a fourth connection edge. The third connection edge is the connection between the inclined surface 32g of one of the two insertion parts 32f of the clamping part 32a of the second connection component 32 located at the left side of FIG. 5 and the first groove 32e. The fourth connection edge is the connection between the inclined surface 32g of the other one of the two insertion parts 32f of the clamping part 32a of the second connection component 32 located at the right side of FIG. 5 and the first groove 32e. The first groove width R2 of the second connection component 32 is less than or equal to the wire diameter d2 of the wire core 422 of the second power cable 42, so that the two insertion parts 32f are inserted into the insulating sleeve 421 of the second power cable 42 and contacted with the wire core 422 of the second power cable 42 when the second power cable 42 is accommodated in the first groove 32e.

Please refer to FIGS. 4 and 6 again. The casing 2 includes at least one first hole 25a and at least one second hole 25b. In this embodiment, the number of the first hole 25a is two. The two first holes 25a are disposed on the fifth lateral surface 25e of the casing 2. The number of the second hole 25b is two. The two second holes 25b are disposed on the sixth lateral surface 20f of the casing 2. The positions of the two first holes 25a are corresponding to the positions of the two second holes 25b, respectively. The diameter M1 of one of the two first holes 25a located at the left side of FIG. 6 is equal to the diameter of the corresponding second hole 25b. The diameter M1 of one of the two first holes 25a and the diameter of the corresponding second hole 25b are greater than the wire diameter D1 of the first power cable 41, respectively. When the first power cable 41 is accommodated in the first accommodation space 21, the two ends of the first power cable 41 are exposed to the exterior of the casing 2 through the corresponding first hole 25a and the corresponding second hole 25b, respectively. The diameter M2 of the other one of the two first holes 25a located at the right side of FIG. 6 is equal to the diameter of the corresponding second hole 25b. The diameter M2 of the other one of the two first holes 25a and the diameter of the corresponding second hole 25b are greater than the wire diameter D2 of the second power cable 42, respectively. When the second power cable 42 is accommodated in the first accommodation space 21, the two ends of the second power cable 42 are exposed to the exterior of the casing 2 through the corresponding first hole 25a and the corresponding second hole 25b, respectively.

In this embodiment, the first groove 31e of the first connection component 31 is disposed between the corresponding first hole 25a and the corresponding second hole 25b. The shortest distance between the first groove 31e of the first connection component 31 and the second lateral surface 20b of the casing 2 is greater than or equal to the shortest distance between the corresponding first hole 25a located at the left side of FIG. 6 and the second lateral surface 20b of the casing 2. Moreover, the shortest distance between the first groove 31e of the first connection component 31 and the second lateral surface 20b of the casing 2 is greater than or equal to the shortest distance between the corresponding second hole 25b and the second lateral surface 20b of the casing 2. Consequently, the edge of the casing 2 constituted to the first hole 25a and the edge of the casing 2 constituted to the second hole 25b do not block the first power cable 41 to be accommodated in the first groove 31e.

The first groove 32e of the second connection component 32 is disposed between the corresponding first hole 25a and the corresponding second hole 25b. The shortest distance between the first groove 32e of the second connection component 32 and the second lateral surface 20b of the casing 2 is greater than or equal to the shortest distance between the corresponding first hole 25a located at the right side of FIG. 6 and the second lateral surface 20b of the casing 2. Moreover, the shortest distance between the first groove 32e of the second connection component 32 and the second lateral surface 20b of the casing 2 is greater than or equal to the shortest distance between the corresponding second hole 25b and the second lateral surface 20b of the casing 2. Consequently, the edge of the casing 2 constituted to the first hole 25a and the edge of the casing 2 constituted to the second hole 25b do not block the second power cable 42 to be accommodated in the first groove 32e.

Please refer to FIGS. 2 to 4. The casing 2 includes an upper casing part 26a, a lower casing part 26b, at least one first fixing part 27 and at least one second fixing part 28. The upper casing part 26a and the lower casing part 26b are opposite to each other and assembled to each other. The outer surface of the upper casing part 26a is formed as the first lateral surface 20a of the casing 2. The three outer surfaces of the lower casing part 26b are formed as the second lateral surface 20b, the third lateral surface 20c and the fourth lateral surface 20d of the casing 2, respectively. The connection between the upper casing part 26a and the lower casing part 26b is formed by the turning side between the first lateral surface 20a and the third lateral surface 20c of the casing 2. The upper casing part 26a and the lower casing part 26b are assembled with each other or separated from each other through the turning side between the first lateral surface 20a and the third lateral surface 20c of the casing 2.

The number of the first fixing part 27 is corresponding to the number of the first connection component 31. As shown in FIG. 3, the number of the first fixing part 27 and the number of the first connection component 31 are two, respectively. Each first fixing part 27 includes a plurality of fixing walls 27a and at least one second groove 27b. In this embodiment, each first fixing part 27 includes three fixing walls 27a and two second grooves 27b. The three fixing walls 27a of the first fixing part 27 are formed and extended from the lower casing part 26b constituted to the second lateral surface 20b of the casing 2 toward the upper casing part 26a. The space formed between the three fixing walls 27a and the lower casing part 26b constituted to the third lateral surface 20c of the casing 2 is in communication with the corresponding channel 23. The two second grooves 27b are disposed on the two fixing walls 27a parallel to the sixth lateral surface 20f of the casing 2, respectively. Each second groove 27b is concavely formed by one side of the corresponding fixing wall 27a adjacent to the first lateral surface 20a of the casing 2. One of the two first holes 25a adjacent to the third lateral surface 20c of the casing 2, the second groove 27b of the first fixing part 27, the first groove 31e of the first connection component 31 and one of the two second holes 25b adjacent to the third lateral surface 20c of the casing 2 are aligned to a straight line. Portion of the first power cable 41 is disposed in the second groove 27b of the first fixing part 27 and the first groove 31e of the first connection component 31. Two ends of the first power cable 41 are exposed to the exterior of the casing 2 through the first hole 25a and the second hole 25b adjacent to the third lateral surface 20c of the casing 2, respectively. A second groove width of the second groove 27b of the first fixing part 27 is greater than or equal to the wire diameter D1 of the first power cable 41, so that portion of the first power cable 41 is disposed in the second groove 27b of the first fixing part 27.

The number of the second fixing part 28 is corresponding to the number of the second connection component 32. As shown in FIG. 3, the number of the second fixing part 28 and the number of the second connection component 32 are two, respectively. Each second fixing part 28 includes a plurality of fixing walls 28a and at least one second groove 28b. In this embodiment, each second fixing part 28 includes three fixing walls 28a and two second grooves 28b. The three fixing walls 28a of the second fixing part 28 is formed and extended from the lower casing part 26b constituted to the second lateral surface 20b of the casing 2 toward the upper casing part 26a. The space formed between the three fixing walls 28a and the lower casing part 26b constituted to the fourth lateral surface 20d of the casing 2 are in communication with the corresponding channel 23. The two second grooves 28b are disposed on the two fixing walls 28a parallel to the sixth lateral surface 20f of the casing 2, respectively. Each second groove 28b is concavely formed by one side of the corresponding fixing wall 28a adjacent to the first lateral surface 20a of the casing 2. One of the two first holes 25a adjacent to the fourth lateral surface 20d of the casing 2, the second groove 28b of the second fixing part 28, the first groove 32e of the second connection component 32 and one of the two second holes 25b adjacent to the fourth lateral surface 20d of the casing 2 are aligned to a straight line. Portion of the second power cable 42 is disposed in the second groove 28b of the second fixing part 28 and the first groove 32e of the second connection component 32. Two ends of the second power cable 42 are exposed to the exterior of the casing 2 through the first hole 25a and the second hole 25b adjacent to the fourth lateral surface 20d of the casing 2, respectively. A second groove width of the second groove 28b of the second fixing part 28 is greater than or equal to the wire diameter D2 of the second power cable 42, so that portion of the second power cable 42 is disposed in the second groove 28b of the second fixing part 28.

In some embodiments, the cable connection device 1 includes a covering part 33, as shown in FIG. 4. The covering part 33 is disposed on the third lateral surface 20c of the casing 2 for covering the second accommodation space 22, so that the circuit board 5 is sealed in the second accommodation space 22.

Figure 7:
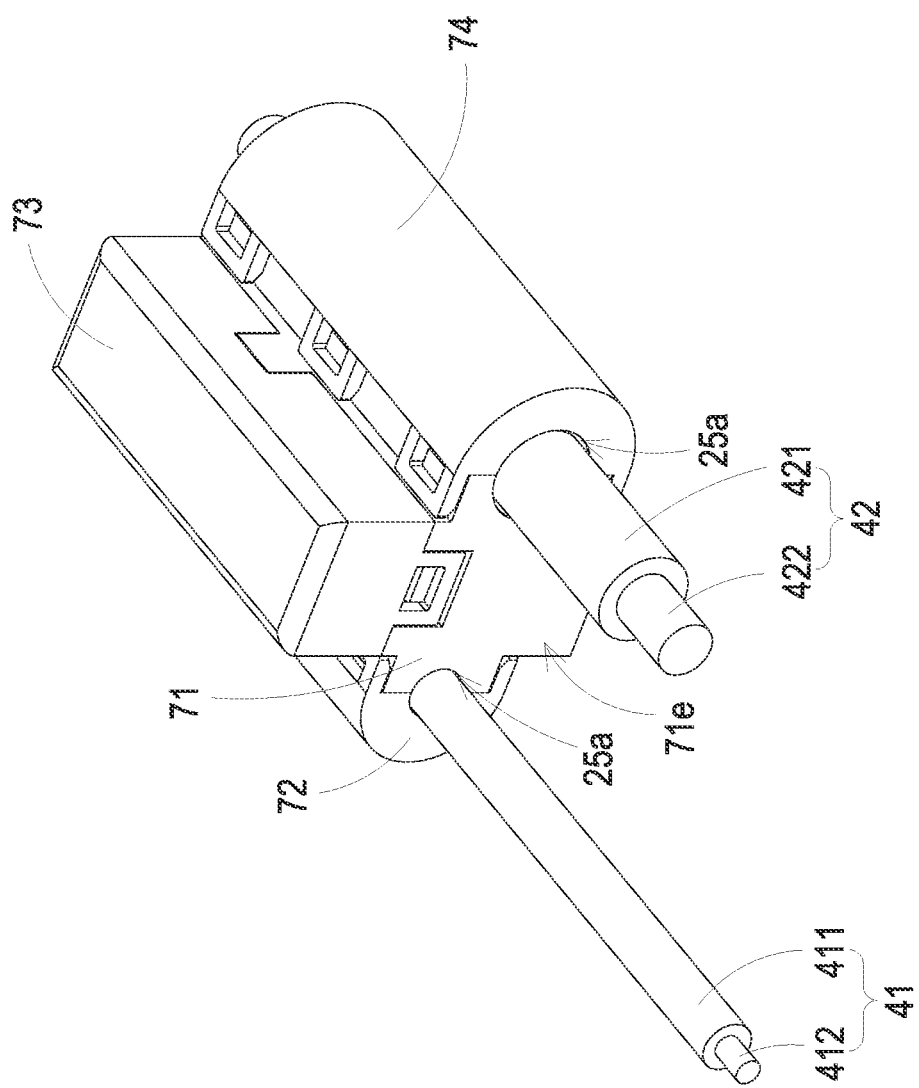
FIG. 7 is a schematic perspective view illustrating a cable connection device according to a second embodiment of the present disclosure.
Figure 8:
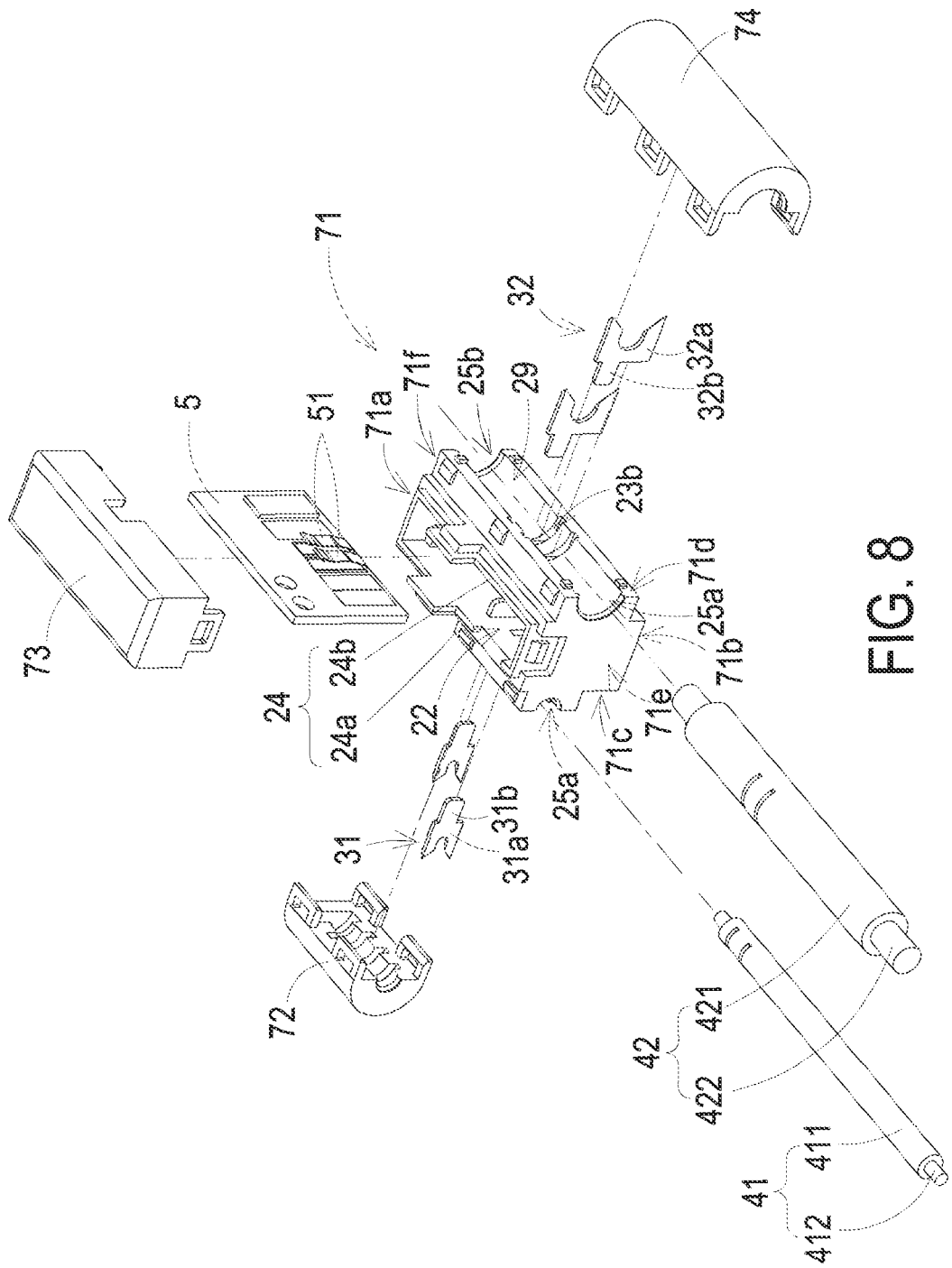
FIG. 8 is a schematic exploded view illustrating the cable connection device of FIG. 7.
Figure 9:
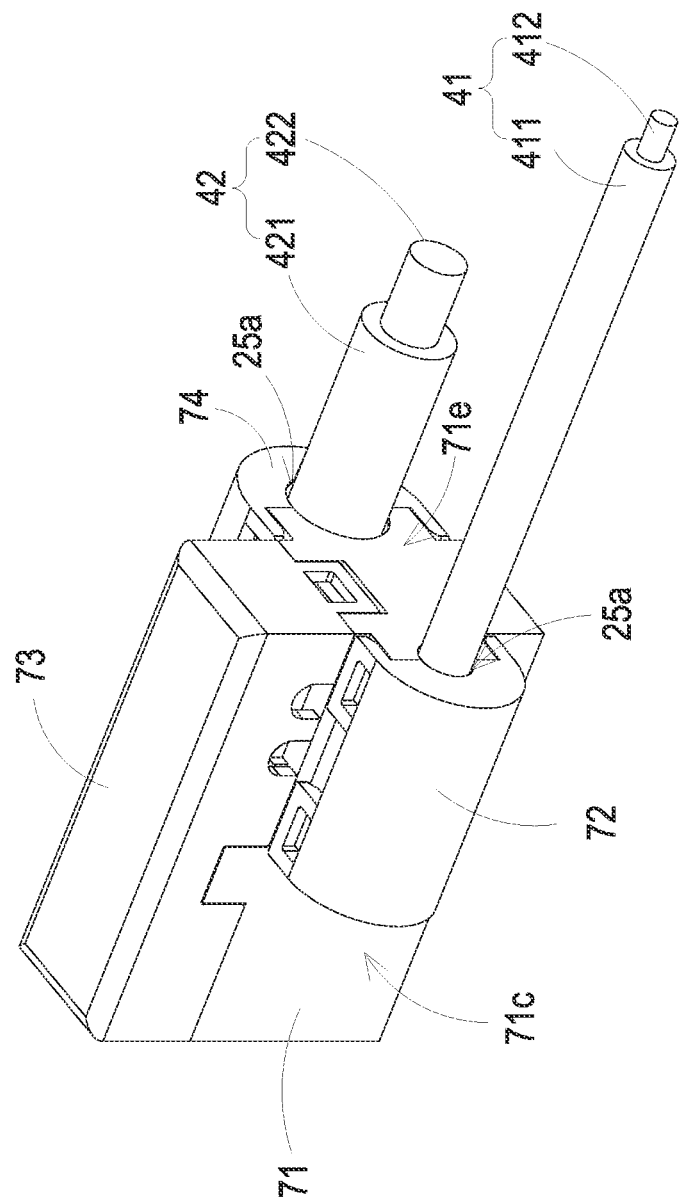
FIG. 9 is a schematic perspective view illustrating the cable connection device of FIG. 7 and taken along another viewpoint.
Figure 10:
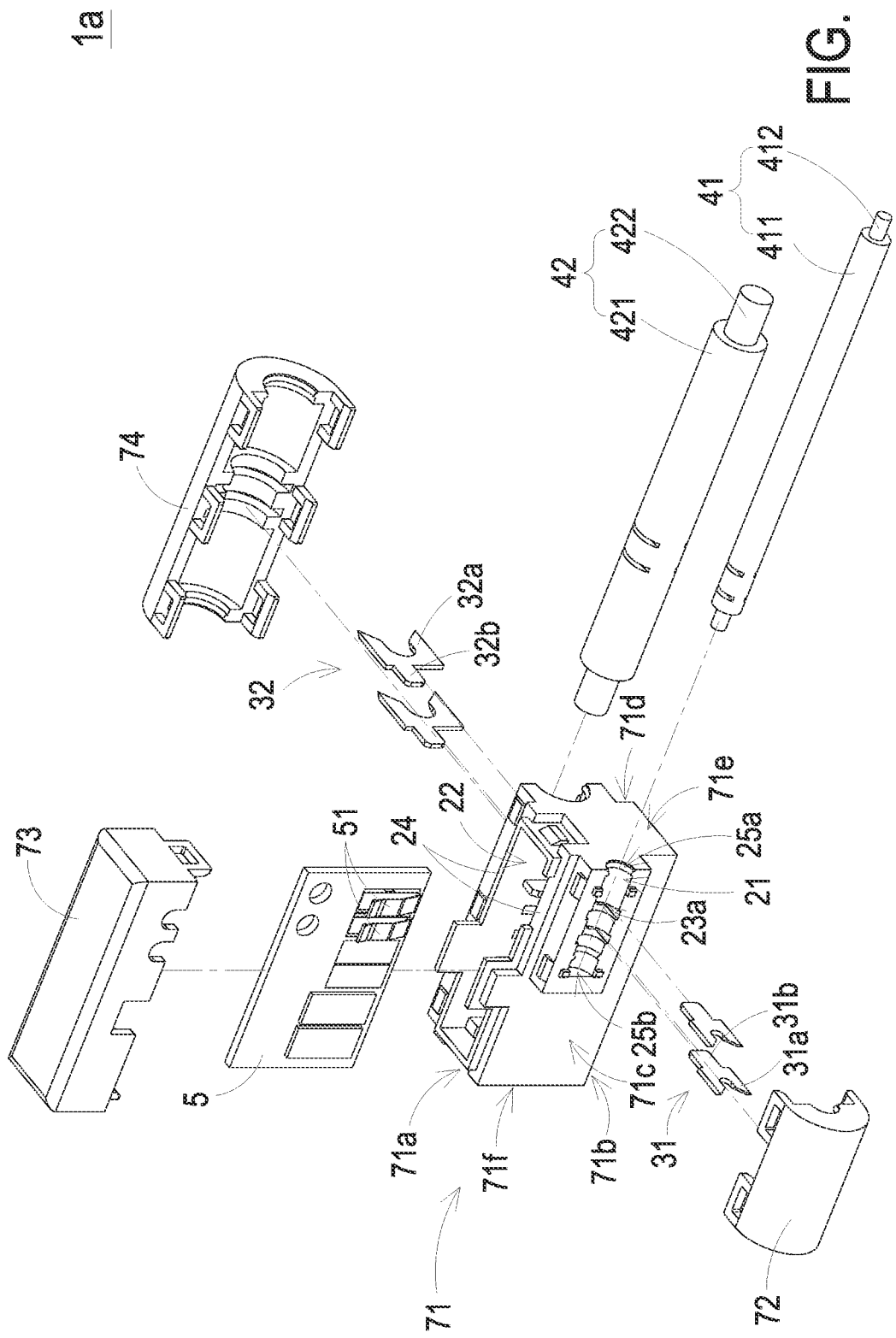
FIG. 10 is a schematic exploded view illustrating the cable connection device of FIG. 9.

FIG. 7 is a schematic perspective view illustrating a cable connection device according to a second embodiment of the present disclosure. FIG. 8 is a schematic exploded view illustrating the cable connection device of FIG. 7. FIG. 9 is a schematic perspective view illustrating the cable connection device of FIG. 7 and taken along another viewpoint. FIG. 10 is a schematic exploded view illustrating the cable connection device of FIG. 9. In comparison with the casing 2 of the cable connection device 1 of the first embodiment only including two accommodation spaces and single partition plate, the casing 2 of the cable connection device 1a of this embodiment includes a first accommodation space 21, a second accommodation space 22, a third accommodation space 29 and two partition plates 24. Hereinafter, the two partition plates 24 are referred to as a first partition plate 24a and a second partition plate 24b. As shown in FIGS. 8 and 10, the first accommodation space 21 and the second accommodation space 22 are separated by the first partition plate 24a located at the left side of FIG. 8, and the first accommodation space 21 and the second accommodation space 22 are disposed beside two sides of the first partition plate 24a, respectively. The second accommodation space 22 and the third accommodation space 29 are separated by the second partition plate 24b located at the right side of FIG. 8, and the second accommodation space 22 and the third accommodation space 29 are disposed beside two sides of the second partition plate 24b, respectively. The second accommodation space 22 is disposed between the first accommodation space 21 and the third accommodation space 29.

Moreover, similar to the casing 2 of the cable connection device 1 of the first embodiment, the casing 2 of the cable connection device 1a of this embodiment includes a first channel 23a and a second channel 23b, as shown in FIGS. 8 and 10. The first channel 23a runs through the first partition plate 24a and in communication between the first accommodation space 21 and the second accommodation space 22. The second channel 23b runs through the second partition plate 24b and in communication between the second accommodation space 22 and the third accommodation space 29.

Furthermore, the first connection component, the second connection component, the first power cable and the second power cable of the first embodiment are disposed in the same accommodation space. In comparison with the first embodiment, the first connection component 31 and the first power cable 41 of the cable connection device 1a of this embodiment are disposed in the first accommodation space 21. The second connection component 32 and the second power cable 42 are disposed in the third accommodation space 29. As shown in FIG. 10, the first connection component 31 of the cable connection device 1a is penetrated through the first channel 23a. The clamping part 31a of the first connection component 31 is formed by one end of the first connection component 31 away from the first partition plate 24a. The clamping part 31a of the first connection component 31 is disposed in the first accommodation space 21. The first conductive part 31b of the first connection component 31 is disposed in the second accommodation space 22. As shown in FIG. 8, the second connection component 32 of the cable connection device 1a is penetrated through the second channel 23b. The clamping part 32a of the second connection component 32 is formed by one end of the second connection component 32 away from the second partition plate 24b. The clamping part 32a of the second connection component 32 is disposed in the third accommodation space 29. The first conductive part 32b of the second connection component 32 is disposed in the second accommodation space 22. The structure of the first connection component 31 and the structure of the second connection component 32 of this embodiment are similar to the structure of the first connection component 31 and the structure of the second connection component 32 of FIG. 3, and are not redundantly described herein.

In this embodiment, the circuit board 5 is disposed in the second accommodation space 22, and disposed between the first connection component 31 and the second connection component 32. Moreover, the circuit board 5 includes a plurality of second conductive parts 51. For example, the circuit board 5 includes four second conductive parts 51. Two of the four second conductive parts 51 are contacted with the two first conductive parts 31b of the first connection component 31, respectively. The other two of the four second conductive parts 51 are contacted with the two first conductive parts 32b of the second connection component 32. The two second conductive parts 51 contacted with the two first conductive parts 31b of the first connection component 31 and the two second conductive parts 51 contacted with the two first conductive parts 32b of the second connection component 32 are disposed on the two opposite sides of the circuit board 5.

Moreover, the casing 2 of cable connection device 1 of the first embodiment is constituted by the upper casing part 26a and the lower casing part 26b. In comparison with the first embodiment, the casing 2 of the cable connection device 1a of this embodiment includes a main body 71, a first covering part 72, a second covering part 73 and a third covering part 74 assembled with each other. The main body 71 includes a first lateral surface 71a, a second lateral surface 71b, a third lateral surface 71c, a fourth lateral surface 71d, a fifth lateral surface 71e and a sixth lateral surface 71f. As shown in FIGS. 8 and 10, the first lateral surface 71a and the second lateral surface 71b of the main body 71 are opposite to each other. The third lateral surface 71c and the fourth lateral surface 71d of the main body 71 are opposite to each other and disposed between the first lateral surface 71a and the second lateral surface 71b. The fifth lateral surface 71e and the sixth lateral surface 71f are opposite to each other, disposed between the first lateral surface 71a and the second lateral surface 71b, and disposed between the third lateral surface 71c and the fourth lateral surface 71d. The first covering part 72 is disposed on the third lateral surface 71c of the main body 71 for covering the first accommodation space 21. The second covering part 73 is disposed on the first lateral surface 71a of the main body 71 for covering the second accommodation space 22. The third covering part 74 is disposed on the fourth lateral surface 71d of the main body 71 for covering the third accommodation space 29.

Please refer to FIGS. 8 and 10, the casing 2 includes a plurality of first holes 25a and a plurality of second holes 25b. In this embodiment, the casing 2 includes two first holes 25a and two second holes 25b. The two first holes 25a are disposed on the fifth lateral surface 71e of the main body 71. One of the two first holes 25a is formed by assembling one end of the first covering part 72 with the third lateral surface 71c of the main body 71. The other one of the two first holes 25a is formed by assembling one end of the third covering part 74 with the fourth lateral surface 71d of the main body 71. The two second holes 25b are disposed on the sixth lateral surface 71f of the main body 71. One of the two second holes 25b is formed by assembling the other end of the first covering part 72 with the third lateral surface 71c of the main body 71. The other one of the two second holes 25b is formed by assembling the other end of the third covering part 74 with the fourth lateral surface 71d of the main body 71.

The positions of the two first holes 25a are corresponding to the positions of the two second holes 25b, respectively. One of the two first holes 25a and one of the two second holes 25b are disposed beside two sides of the first accommodation space 21. The other one of the two first holes 25a and the other one of the two second holes 25b are disposed beside two sides of the third accommodation space 29. The first power cable 41 is disposed in the first accommodation space 21 and exposed to the exterior of the casing 2 through the corresponding first hole 25a and the corresponding second hole 25b. The wire width of the first power cable 41 is less than the diameter of the corresponding first hole 25a and the diameter of the corresponding second hole 25b. The second power cable 42 is disposed in the third accommodation space 29 and exposed to the exterior of the casing 2 through the corresponding first hole 25a and the corresponding second hole 25b. The wire width of the second power cable 42 is less than the diameter of the corresponding first hole 25a and the diameter of the corresponding second hole 25b.

From the above descriptions, the present disclosure provides a cable connection device. The cable connection device includes two connection components. The clamping part of each connection component is contacted with the corresponding wire core of the power cable. The first conductive part of each connection component is contacted with the second conductive part of the circuit board, so that the first conductive part of each connection component is electrically connected with the control element. The control element and the signal source of the conventional charging device are connected with each other by utilizing soldering process, and the control element and the ground wire of the conventional charging device are connected with each other by utilizing riveting process. In comparison with the conventional charging device, the connection component of the cable connection device of the present disclosure is connected with the wire core by piercing the power cable, and the connection component of the cable connection device of the present disclosure is contacted with the circuit board. Consequently, the cable connection device of the present disclosure does not use soldering process or riveting process additionally. When the power cable and the circuit board need to be replaced, the power cable and the circuit board can be replaced by simply disassembling. The assembling process of the cable connection device of the present disclosure is simple. The stability and the production yield of the cable connection device are increased. The manufacturing cost of the cable connection device is reduced. Moreover, the connection between the first power cable and the first connection component and the connection between the second power cable and the second connection component are disposed within the casing. Consequently, the connections may not be impacted by the external force, so that the connections are stable and not easy to separate.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A cable connection device, comprising:
   a casing comprising a first accommodation space, a second accommodation space and at least one channel, wherein the at least one channel is in communication between the first accommodation space and the second accommodation space;
   at least one connection component penetrated through the at least one channel, wherein the connection component comprises a clamping part and a first conductive part, the clamping part and the first conductive part are opposite to each other, the clamping part is disposed in the first accommodation space, and the first conductive part is disposed in the second accommodation space, wherein the clamping part comprises a first groove and two insertion parts, wherein the clamping part comprises a first surface and a second surface, the first surface and the second surface are opposite to each other, each of the two insertion parts has an inclined surface, the inclined surface is disposed between the first surface and the second surface, and the inclined surface is inclined from the first surface toward the second surface, wherein a first angle is formed between the first surface and the inclined surface, and a second angle is formed between the second surface and the inclined surface, wherein the first angle is less than the second angle;
   at least one power cable, wherein at least a portion of the at least one power cable is disposed in the first accommodation space, the at least one power cable comprises an insulating sleeve and a wire core, and an outer periphery of the wire core is covered by the insulating sleeve, wherein the clamping part clamps the at least one power cable and partially pierces the insulating sleeve, so that the clamping part is electrically connected with the wire core; and
   a circuit board disposed in the second accommodation space and comprising at least one second conductive part, wherein the at least one second conductive part is contacted with the first conductive part.

2. The cable connection device according to claim 1, wherein the at least one connection component is made of conductive material, and the first groove is concavely formed by one side of the clamping part for accommodating the at least one power cable, wherein the two insertion parts are disposed beside two sides of the first groove and inserted into the insulating sleeve, so that the two insertion parts are contacted with the wire core.

3. The cable connection device according to claim 1, wherein the first angle is 45 degrees, and the second angle is 135 degrees.

4. The cable connection device according to claim 2, wherein the first groove has a first groove width, and the first groove width is less than or equal to a wire diameter of the wire core of the at least one power cable.

5. The cable connection device according to claim 1, wherein the casing comprises a first lateral surface, a second lateral surface, a third lateral surface, a fourth lateral surface, a fifth lateral surface and a sixth lateral surface, the first lateral surface and the second lateral surface are opposite to each other, the third lateral surface and the fourth lateral surface are opposite to each other, and the fifth lateral surface and the sixth lateral surface are opposite to each other, wherein the casing comprises at least one first hole and at least one second hole, the at least one first hole is disposed on the fifth lateral surface of the casing, the at least one second hole is disposed on the sixth lateral surface of the casing, and a position of the at least one first hole is corresponding to a position of the at least one second hole, wherein a diameter of the first hole and a diameter of the second hole are greater than or equal to a wire diameter of the at least one power cable, respectively.

6. The cable connection device according to claim 5, wherein the clamping part comprises a first groove, the first groove is concavely formed by one side of the clamping part for accommodating the at least one power cable, a shortest distance between the first groove and the second lateral surface of the casing is greater than or equal to a shortest distance between the first hole and the second lateral surface of the casing, and the shortest distance between the first groove and the second lateral surface of the casing is greater than or equal to a shortest distance between the second hole and the second lateral surface of the casing.

7. The cable connection device according to claim 5, wherein the casing comprises an upper casing part, a lower casing part and at least one fixing part, the upper casing part and the lower casing part are opposite to each other and assemble to each other, an outer surface of the upper casing part is constituted to the first lateral surface of the casing, three outer surfaces of the lower casing part are constituted to the second lateral surface, the third lateral surface and the fourth lateral surface, respectively, the at least one fixing part includes a plurality of fixing walls and at least one second groove, the plurality of fixing walls are formed and extended from the lower casing part toward the upper casing part, a space formed between the plurality of fixing walls and the lower casing part constituted to the third lateral surface of the casing is in communication with the at least one channel, the second groove is concavely formed by one side of corresponding one of the plurality of fixing walls adjacent to the first lateral surface of the casing, wherein the first groove of the clamping part, the second groove of the fixing part, the first hole and the second hole of the casing are aligned to a straight line, a second groove width of the second groove is greater than or equal to the wire diameter of the at least one power cable.

8. The cable connection device according to claim 1, wherein the at least one power cable comprises a first power cable and a second power cable, the first power cable transmits a signal to a load, and the second power cable is connected with ground, wherein the at least one connection component comprises a first connection component and a second connection component, and the clamping part of the first connection component is inserted into the insulating sleeve of the first power cable and contacted with the wire core of the first power cable, so that the first conductive part of the first connection component is contacted with a corresponding one of the at least one second conductive part, wherein the clamping part of the second connection component is inserted into the insulating sleeve of the second power cable and contacted with the wire core of the second power cable, so that the first conductive part of the second connection component is contacted with a corresponding one of the at least one second conductive part.

9. The cable connection device according to claim 1, further comprising a control element and a connection cable, wherein the connection cable is connected between the control element and the circuit board, and the connection cable is electrically connected with the second conductive part through a conductive wire within the circuit board.

10. A cable connection device, comprising:
a casing comprising a first accommodation space, a second accommodation space, a third accommodation space, a first channel and a second channel, wherein the first channel is in communication between the first accommodation space and the second accommodation space, and the second channel is in communication between the second accommodation space and the third accommodation space;
a first connection component penetrated through the first channel and comprising a clamping part and a first conductive part, wherein the clamping part and the first conductive part of the first connection component are opposite to each other, the clamping part of the first connection component is disposed in the first accommodation space, the first conductive part of the first connection component is disposed in the second accommodation space;
a second connection component penetrated through the second channel and comprising a clamping part and a first conductive part, wherein the clamping part and the first conductive part of the second connection component are opposite to each other, the clamping part of the second connection component is disposed in the third accommodation space, the first conductive part of the second connection component is disposed in the second accommodation space;
a first power cable, wherein at least a portion of the first power cable is disposed in the first accommodation space, the first power cable comprises an insulating sleeve and a wire core, and an outer periphery of the wire core of the first power cable is covered by the insulating sleeve, wherein the clamping part of the first connection component clamps the first power cable and partially pierces the insulating sleeve of the first power cable, so that the clamping part of the first connection component is electrically connected with the wire core of the first power cable;
a second power cable, wherein at least a portion of the second power cable is disposed in the third accommodation space, the second power cable comprises an insulating sleeve and a wire core, and an outer periphery of the wire core of the second power cable is covered by the insulating sleeve, wherein the clamping part of the second connection component clamps the second power cable and partially pierces the insulating sleeve of the second power cable, so that the clamping part of the second connection component is electrically connected with the wire core of the second power cable; and
a circuit board disposed in the second accommodation space and comprising a plurality of second conductive parts, wherein the plurality of second conductive parts are contacted with the first conductive part of the first connection component and the second conductive part of the second connection component, respectively.

11. The cable connection device according to claim 10, wherein the second accommodation space is disposed between the first accommodation space and the third accommodation space.

12. The cable connection device according to claim 10, wherein the first connection component and the second connection component are made of conductive material, respectively, and the clamping part of the first connection component and the clamping part of the second connection component comprise a first groove and two insertion parts, respectively, wherein the first groove of the clamping part of the first connection component is concavely formed by one side of the clamping part of the first connection component for accommodating the first power cable, and the two insertion parts of the first connection component are disposed beside two sides of the first groove of the clamping part of the first connection component and inserted into the insulating sleeve of the first power cable, so that the two insertion parts are contacted with the wire core of the first power cable, wherein the first groove of the clamping part of the second connection component is concavely formed by one side of the clamping part of the second connection component for accommodating the second power cable, and the two insertion parts of the second connection component are disposed beside two sides of the first groove of the clamping part of the second connection component and inserted into the insulating sleeve of the second power cable, so that the two insertion parts are contacted with the wire core of the second power cable.

13. The cable connection device according to claim 12, wherein the clamping part of the first connection component and the clamping part of the second connection component comprise a first surface and a second surface, respectively, the first surface and the second surface are opposite to each other, each of the two insertion parts has an inclined surface, the inclined surface is disposed between the first surface and the second surface, and the inclined surface is inclined from the first surface toward the second surface.

14. The cable connection device according to claim 13, wherein a first angle is formed between the first surface and the inclined surface, and a second angle is formed between the second surface and the inclined surface, wherein the first angle is less than the second angle.

15. The cable connection device according to claim 14, wherein the first angle is 45 degrees, and the second angle is 135 degrees.

16. The cable connection device according to claim 12, wherein the first groove of the first connection component has a first groove width, and the first groove width of the first connection component is less than or equal to a wire diameter of the wire core of the first power cable, wherein the first groove of the second connection component has a first groove width, and the first groove width of the second connection component is less than or equal to a wire diameter of the wire core of the second power cable.

17. The cable connection device according to claim 10, wherein the casing comprises a main body, a first covering part, a second covering part and a third covering part assembled with each other, wherein the main body includes a first lateral surface, a second lateral surface, a third lateral surface, a fourth lateral surface, a fifth lateral surface and a sixth lateral surface, the first lateral surface and the second lateral surface of the main body are opposite to each other, the third lateral surface and the fourth lateral surface of the main body are opposite to each other, and the fifth lateral surface and the sixth lateral surface of the main body are opposite to each other, wherein the first covering part covers the first accommodation space, the second covering part covers the second accommodation space, and the third covering part covers the third accommodation space.

18. The cable connection device according to claim 17, wherein the casing comprises a plurality of first holes and a plurality of second holes, the plurality of first holes are disposed on the fifth lateral surface of the main body, the plurality of second holes are disposed on the sixth lateral surface of the main body, and positions of the plurality of first holes are corresponding to positions of the plurality of second holes, respectively, wherein two ends of the first power cable are exposed to an exterior of the casing through the corresponding one of the plurality of first holes and the corresponding one of the plurality of second holes, and a wire diameter of the first power cable is less than a first diameter of the corresponding one of the plurality of first holes and a second diameter of the corresponding one of the plurality of second holes, wherein two ends of the second power cable are exposed to the exterior of the casing through the corresponding one of the plurality of first holes and the corresponding one of the plurality of second holes, and a wire diameter of the second power cable is less than a third diameter of the corresponding one of the plurality of first holes and a fourth diameter of the corresponding one of the plurality of second holes.

19. The cable connection device according to claim 10, wherein the second conductive part contacted with the first conductive part of the first connection component and the second conductive part contacted with the first conductive part of the second connection are disposed on two opposite sides of the circuit board.

20. The cable connection device according to claim 10, further comprising a control element and a connection cable, wherein the connection cable is connected between the control element and the circuit board, and the connection cable is electrically connected with the plurality of second conductive parts through conductive wires within the circuit board.

* * * * *